(12) United States Patent
Nyander et al.

(10) Patent No.: US 12,188,728 B2
(45) Date of Patent: Jan. 7, 2025

(54) HEAT EXCHANGER COMPRISING A PLATE PACKAGE AND A HOLLOW MANIFOLD

(71) Applicant: ALFA LAVAL CORPORATE AB, Lund (SE)

(72) Inventors: Anders Nyander, Staffanstorp (SE); Joakim Öhlin, Älvsjö (SE)

(73) Assignee: ALFA LAVAL CORPORATE AB, Lund (SE)

( * ) Notice: Subject to any disclaimer, the term of this patent is extended or adjusted under 35 U.S.C. 154(b) by 268 days.

(21) Appl. No.: 17/919,874

(22) PCT Filed: Mar. 30, 2021

(86) PCT No.: PCT/EP2021/058225
§ 371 (c)(1),
(2) Date: Oct. 19, 2022

(87) PCT Pub. No.: WO2021/213784
PCT Pub. Date: Oct. 28, 2021

(65) Prior Publication Data
US 2023/0168044 A1    Jun. 1, 2023

(30) Foreign Application Priority Data

Apr. 23, 2020 (EP) ..................... 20170984

(51) Int. Cl.
*F28D 9/00* (2006.01)
*B33Y 80/00* (2015.01)
*F28F 9/02* (2006.01)

(52) U.S. Cl.
CPC .............. *F28D 9/005* (2013.01); *B33Y 80/00* (2014.12); *F28F 9/026* (2013.01); *F28F 2255/18* (2013.01)

(58) Field of Classification Search
CPC ....... F28D 9/005; F28F 9/026; F28F 2255/18; B33Y 80/00
(Continued)

(56) References Cited

U.S. PATENT DOCUMENTS 9,933,215 B2    4/2018 Ollier
10,480,871 B2 * 11/2019 Mueller .................... F28D 1/00
(Continued)

FOREIGN PATENT DOCUMENTS

CN    104380028 A    2/2015
CN    107208989 A    9/2017
(Continued)

OTHER PUBLICATIONS

Office Action (Notice of Reasons for Rejection) issued on Jan. 29, 2024, in corresponding Japanese Patent Application No. 2022-564437 and English translation of the Office Action. (14 pages).
(Continued)

*Primary Examiner* — Jon T. Schermerhorn, Jr.
(74) *Attorney, Agent, or Firm* — BUCHANAN INGERSOLL & ROONEY PC

(57) ABSTRACT

The present invention relates to a plate heat exchanger comprising a plate package and a manifold both made of metal. The plate package comprises a plurality of heat exchanger plates stacked between end plates. The heat exchanger plates being sealed to each other and form alternating first plate interspaces for a first medium and second plate interspaces for a second medium. The plate package defines at least two port channels communicating with the first plate interspaces. At least one of the end plates define connection ports communicating with a respective port channel. The manifold defines a port opening, a distant opening and a flow passage extending between the port opening and the distant opening. The manifold being fixedly
(Continued)

attached to one of the end plates such that the port opening of the manifold covers one of the connection ports. The manifold being made by additive manufacturing, moulding or casting.

20 Claims, 5 Drawing Sheets

(58) Field of Classification Search
USPC .......................................................... 165/166
See application file for complete search history.

(56) References Cited

U.S. PATENT DOCUMENTS

| | | | |
|---|---|---|---|
| 10,520,075 | B2 | 12/2019 | Baaso et al. |
| 11,287,197 | B2* | 3/2022 | Tonellato ................. F28F 3/08 |
| 11,747,095 | B2* | 9/2023 | Vandermeer ........... B33Y 80/00 |
| | | | 165/166 |
| 2008/0149304 | A1 | 6/2008 | Slaughter |
| 2013/0319634 | A1 | 12/2013 | Sheppard et al. |
| 2014/0246173 | A1 | 9/2014 | Cheadle et al. |
| 2016/0231067 | A1 | 8/2016 | Dittly et al. |
| 2016/0231068 | A1 | 8/2016 | Schmitz et al. |
| 2017/0089643 | A1 | 3/2017 | Arafat |
| 2017/0146305 | A1 | 5/2017 | Kuczek et al. |
| 2017/0211896 | A1 | 7/2017 | Schwalm et al. |
| 2017/0363361 | A1 | 12/2017 | Turney |
| 2018/0045471 | A1 | 2/2018 | Dietrich |
| 2018/0274406 | A1 | 9/2018 | Dries et al. |
| 2018/0347686 | A1* | 12/2018 | Baaso ................. F16H 57/0413 |
| 2019/0134894 | A1 | 5/2019 | Vadder |
| 2020/0218293 | A1* | 7/2020 | Culler ................. G05D 23/025 |

FOREIGN PATENT DOCUMENTS

| | | |
|---|---|---|
| CN | 107427920 A | 12/2017 |
| DE | 102018208627 A1 | 12/2018 |
| EP | 3404351 A1 | 11/2018 |
| FR | 3057057 A1 | 4/2018 |
| JP | 2008144977 A | 6/2008 |
| JP | 2017125633 A | 7/2017 |
| JP | 2018511767 A1 | 4/2018 |
| WO | 9638699 A1 | 12/1996 |
| WO | 2013177711 A1 | 12/2013 |
| WO | 2016122970 A1 | 8/2016 |
| WO | 2016138997 A1 | 9/2016 |

OTHER PUBLICATIONS

International Search Report (PCT/ISA/210) and Written Opinion (PCT/ISA/237) mailed on Jun. 18, 2021, by the European Patent Office as the International Searching Authority for International Application No. PCT/EP2021/058225. (11 pages).

* cited by examiner

HEAT EXCHANGER COMPRISING A PLATE PACKAGE AND A HOLLOW MANIFOLD

The present invention relates to a heat exchanger comprising a plate package and a manifold.

INTRODUCTION

Plate heat exchangers are used in different fields of the industry for a number of different heat exchange purposes. Plate heat exchangers comprise a plate package having a plurality of heat exchanger plates. Each heat exchanger plate is typically corrugated and made of stamped sheets of metal. The heat exchanger plates are stacked between first and second end plates. The heat exchanger plates being sealed to each other and to the end plates and form alternating first plate interspaces for a first medium and second plate interspaces for a second medium. The heat exchange takes place between the first medium and the second medium. The heat exchanger plates and at least one of the end plates are provided with port holes which form port channels extending through the plate package for communicating with the plate interspaces which are sealed from the outside environment except for the port channels.

The port holes of the end plates of define connection ports. Typically, one of the end plates has port holes and the other is closed off. A heat exchanger can be supplied with a number of different standard connection ports. The traditional design has one port in each corner whereby a first pair of connection ports communicates only with the first plate interspaces and a second pair of connection ports communicates only with the second plate interspaces.

It is well known in the art that plate heat exchangers have several advantages compared to other heat exchanger designs. Plate heat exchangers are very energy efficient, have a high heat transfer coefficient and are cost effective to manufacture when compared with other types of heat exchangers. In particular brazed or bonded plate heat exchangers combine a high thermal and mechanical performance and a compact shape. However, when it comes to the flexibility of the placement of interfaces such as connection ports and the integration of additional functionality such as sensors the plate heat exchanger design is very limiting. The traditional layout of the plate package having rectangular heat exchanger plates with one connection port in each corner is dominating in the industry.

In various applications the standard one port in each corner layout is not suitable. The reason could be that the installation should be made in a tight space or that integration of additional functionalities is needed etc. In some applications this can be achieved with a standard brazed heat exchanger combined with a polymeric function block which accommodates the external interfaces. This is common for e.g. domestic hot water appliances and district heating modules. However, in many applications the demands on integrity, chemical resistance or process parameters require a homogeneous metallic design.

Additive Manufacturing (AM), also known as 3D-printing, has recently been introduced as a solution for efficient and flexible design and manufacturing of heat exchangers. 3D printing refers to a process of manufacturing 3D objects by additively depositing of a metallic powder material layer by layer onto a surface, thereby forming a three-dimensional metal structure. Although 3D printed heat exchangers allow a high flexibility in relation to the layout and design of the heat exchanger, the thermal and mechanical efficiency of traditional plate heat exchangers based on thin stamped plates are hard to match. Also, the production cost and production time of a 3D printed heat exchanger significantly exceeds the production cost and production time for a comparable plate heat exchanger made from stamped plates. The use of 3D printed heat exchangers has thus so far in most cases been limited to prototyping.

US 2019/0134894 A1 relates to a header for a ducted heat exchanger. The header being made by additive manufacturing. The header is produced in-situ by additive manufacturing as the tubes are stacked in the heat exchanger.

US 2017/0089643 A1 relates to a heat exchanger completely made by Added Manufacturing enabling the configurations of the heat exchanger's flow channels to be optimized for improved heat transfer performance, for improved resistance to thermal and mechanical stresses, and for optimization based upon the environment in which the heat exchanger will be situated.

US 2016/0231067 A1 relates to a header made by added manufacturing for a heat exchanger core. The core may be considered a plate-fin, a shell-tube, or other air-air, or air-fluid passage.

US 2017/363361 & US2017/0146305 relates to a heat exchanger having a core with a first end and a second end and having a first plurality of hot flow channels fluidly isolated from a first plurality of cool flow channels. A first header is connected to the first end of the core. All or parts of heat exchanger may be made through additive manufacturing.

US 2017/0211896 A1 relates to a heat exchanger first and second sections including flow passages configured for heat exchange between fluid within the flow passages, and a centre manifold disposed between the first and second sections. Fluid enters the manifold at one end, passes through the first and second sections and exits the manifold at an opposing end. The centre manifold can be made through additive manufacturing.

FR 3057057 relates to a method of 3D printing a plate heat exchanger. It is thereby possible to realize a stack of layers, each of the layers being successively formed by targeted by heating of a deposition of a metal powder.

None of the above solutions comes even close to having the efficiency of a plate heat exchanger.

It is thus an object of the present invention to provide technologies which combines the efficiency of traditional brazed or bonded plate heat exchangers with the flexibility of 3D-printed heat exchangers.

SUMMARY OF THE INVENTION

The above object is in a first aspect of the present invention realized by a plate heat exchanger comprising a plate package and a manifold both made of metal, the plate package comprising a plurality of heat exchanger plates stacked between end plates, the heat exchanger plates being sealed to each other and to the end plates and form alternating first plate interspaces for a first medium and second plate interspaces for a second medium, the heat exchanger plates are sealed to each other at circumferential rims of each heat exchanger plate, the plate package defines at least four port channels whereby at least two port channels communicating with the first plate interspaces and being sealed from communication with the second plate interspaces, at least one of the end plates define connection ports communicating with a respective port channel, the manifold defining a port opening, a distant opening and a flow passage extending between the port opening and the distant opening, the manifold being fixedly attached to one or both of the end plates such that the port opening of the manifold covers one of the connection ports enabling communication between one of the plate interspaces and the distant opening, the manifold being made by additive manufacturing, moulding or casting.

The heat exchanger plates are typically made of thin stamped plates and include port holes for the introduction and removal of fluids. The heat exchanger plates are stacked in relation to each other such that the port holes are put in precise match to form the port channels. The heat exchanger plates are sealed to each other at circumferential rims forming the alternating first plate interspaces and second plate interspaces between the heat exchanger plates. Typically, the plate package is made of stainless steel. If a lightweight design is required both the stamped plate pack and the 3D-printed manifold can be produced in e.g. aluminium or titanium. Both materials are also suitable for bonding technology.

At least two port channels are provided and each port channel is accessible from one of the end plates via the respective connection ports in the end plate whereas the opposite end of the port channel is closed off at the opposing end plate, however, typically all port channels are accessible from the same end plate and the opposite end plate is closed off. The two port channels provide access to the first plate interspaces whereby access to the second plate interspaces are prevented from the same port channels. Further port channels may be used to access the second plate interspaces, or alternatively access to the second plate interspaces may be provided via apertures at the circumferential rims of the plates. The first- and second media are fluids, typically liquids, and heat exchange between the media are established when they flow though the respective plate interspace. More than four port channels are possible, such as 6 port channels, with corresponding connection ports.

The end plates in the present context is understood to be the first and the last plate of the stack. These plates are consequently exposed to the exterior whereas the other plates only expose the circumferential rim to the exterior. The end plates may form part of the first or second plate interspaces and thus be in direct fluid contact. Alternatively, the end plates may be separate "frame plates" for reinforcement of the structure. Using such frame plate may also be useful for establishing a flat and even contact surface for the manifold.

In a preferred solution a plate pack consisting of stamped plates are stacked in conventional manner. The plate package is of a standardized type having port connectors at a predetermined location for optimal efficiency. On top of the plate pack the manifold is attached providing added flexibility.

The manifold is also known as a header or housing and is made by additive manufacturing, moulding or casting. Moulding and casting should in the present context also include related technologies. Additive manufacturing and 3D printing are considered synonymous and include methods such as Direct metal laser sintering (DMLS) and Selective laser sintering (SLS).

The manifold has at least one port opening which covers a respective connection port of the plate package and enables communication between one of the plate interspaces and the distant opening which may be located spaced apart from the connection opening of the plate package. The distant opening in the present context is the opening in the manifold which communicates via the port opening of the manifold with one of the connection ports of the plate package. It may be located directly above the connection port of the plate package or disposed in any direction. The location of the distant opening is determined by the application of the heat exchanger and the manifold may be custom made to allow the heat exchanger to be accommodated in tight spaces.

According to a further embodiment, the manifold being made by additive manufacturing.

The present heat exchanger according to the further embodiment combines the best parts of the plate heat exchanger and the 3D printed heat exchanger. The combination of a plate heat exchanger and a 3D printed manifold is also especially suitable for low volume production.

According to a further embodiment, the plate package defines at least two further port channels communicating with the second plate interspaces and are sealed from communication with the first plate interspaces, preferably each heat exchanger plate in the plate package has a rectangular shape and an end plate with a connection port in each corner.

In a preferred solution the rims of the plates are sealed to each other allowing access to the first- and second plate interspaces via the respective connection ports. The plates are preferably of a standard design with ports in the corners which provides for efficient flow distribution and utilisation of the plate area. On top of the plate pack the 3D printed or casted manifold is attached.

According to a further embodiment, more than one connection port of the plate pack are connected to a corresponding flow passage and distant opening in the manifold.

In this way the location of any number of connection ports may be displaced compared to the position of the connection port in the plate package.

According to a further embodiment, the manifold comprises an integrated valve seat and/or an integrated thermostat housing and/or an integrated sensor housing and/or an integrated lifting loop and/or mounting bracket.

The use of a manifold may also be used to integrate e.g. valves, sensors and thermostats in a flexible way. Thereby 3D printed piece constituting the manifold may include housings for valves, sensors, thermostats etc. One or more lifting loops may be included for easy lifting and handling of the heat exchanger. One or more mounting bracket may be included for mounting the heat exchanger in a fixated position onto a wall, a frame or other equipment or object.

According to a further embodiment, the end plates have a greater thickness than the heat exchanger plates.

The heat exchanger may also comprise a frontal end plate and a rear end plate made of a thicker sheet metal than the heat exchanger plates. The purpose of the cover plates is to provide stability to the heat exchanger and to provide mounting positions for brackets or the like.

According to a further embodiment, the end plate having the attached manifold only covers a part of the surface of the heat exchanging plate which the respective end plate faces.

The end plate having the manifold must not cover the complete surface of the heat exchanging plate which the respective end plate faces, but may exclude some parts, e.g. some of the connection ports which may be connected to other appliances in a conventional way by piping.

According to a further embodiment the manifold is permanently sealed to the first end plate and the heat exchanger plates are permanently sealed to each other and to the end plates by brazing, diffusion bonding or gluing.

By combining a "conventional" brazed or bonded plate pack with a manifold created by additive manufacturing a heat exchanger design which is both flexible and efficient can be made. The plate pack and the manifold can thereby also be brazed together.

In copper brazed heat exchangers, e.g. where the heat exchanger plates are made from stainless steel, the complete plate package is brazed together. This accomplishes a brazed copper sealing around the edge of the plates. At the same time, the contact points between the plates are also brazed, which helps the heat exchanger to withstand the effects of high pressures and high temperatures.

Typically, for brazing, a copper foil is put between the plates and also between the plate pack and printed manifold. Typically, this is suitable for brazing of stainless-steel materials, which can be 3D-printed.

Alternatively, the manifold is mounted to the first end plate by screws or bolts and the heat exchanger plates are permanently sealed to each other and to the end plates by brazing, diffusion bonding or gluing. In this way the manifold can be exchanged.

According to a further embodiment, the port opening and the distant opening are oriented in different directions.

The printed flow passage can be directed in any desired way or shape to create the required interface for other appliances and/or for fitting in tight spaces.

According to a further embodiment, the heat exchanger plates have a corrugated pattern, preferably made by stamping or pressing of metal sheets.

The corrugated pattern aids heat transfer by inducing turbulence. Pressing of metal sheets is an efficient way of establishing the corrugations.

The above object is in a second aspect of the present invention realized by a method of manufacturing a manifold for a plate heat exchanger, the plate heat exchanger comprising a plate package made of metal and comprising a plurality of heat exchanger plates stacked between end plates, the heat exchanger plates being sealed to each other and to the end plates and form alternating first plate interspaces for a first medium and second plate interspaces for a second medium, the heat exchanger plates are sealed to each other at circumferential rims of each heat exchanger plate, the plate package defines at least two port channels communicating with the first plate interspaces and being sealed from communication with the second plate interspaces, at least one of the end plates define connection ports communicating with a respective port channel, the method comprising producing a manifold by moulding, casting or additive manufacturing, the manifold defining a port opening, a distant opening and a flow passage extending between the port opening and the distant opening, the port opening of the manifold corresponding to one of the connection ports of one of the end plates of the heat exchanger for enabling communication between one of the plate interspaces and the distant opening.

The method according to the second aspect is preferably used for manufacturing the heat exchanger according to the first aspect.

According to a further embodiment, the method further comprising providing a 3D printer and producing the manifold by additive manufacturing.

The manifold is preferably manufactured by additive manufacturing for maximum flexibility.

According to a further embodiment, the manifold is formed by additively depositing material onto a substrate plate.

In a first variant of the method, the manifold is printed on a substrate plate, subsequently removed and then placed and fixated on the end plate of the plate package. Either the plates of the plate package are already be sealed to each other or the plates are sealed to each other and to the manifold in the same operation by e.g. placing the assembly of the heat exchanger plates, end plates and manifold in a brazing oven to form the heat exchanger According to a further embodiment, the manifold is formed by additively depositing material onto an end plate of a plate package.

In a second variant the manifold is printer directly onto an end plate of a plate package. The end plate is subsequently sealed onto a plate package to form the heat exchanger. Either the end plates and the heat exchanger plates of the plate package are already sealed (brazed) to each other, or the end plates and the heat exchanger plates are sealed to each other and to the manifold in a subsequent operation by e.g. placing the assembly of the heat exchanger plates and the end plates already having a fixated manifold in a brazing oven to form the heat exchanger.

According to a further embodiment, the end plate forms part of the plate package and the connection ports being covered by removable covers during the 3D-printing.

In a third variant, the manifold is 3D printed directly onto an end plate of an already sealed plate package. To avoid having metal powder from the 3D printing process in the port channel of the plate package, the connection port of the end plate must be covered by a removable cover. The cover may e.g. be meltable or dissolvable.

The above object is in a third aspect of the present invention realized by a plate heat exchanger comprising a plate package and a manifold both made of metal, the plate package comprising a plurality of heat exchanger plates stacked between end plates, the heat exchanger plates being sealed to each other and to the end plates and form alternating first plate interspaces for a first medium and second plate interspaces for a second medium, the heat exchanger plates are sealed to each other at circumferential rims of each heat exchanger plate, the plate package defines at least two port channels communicating with the first plate interspaces and being sealed from communication with the second plate interspaces, at least one of the end plates define connection ports communicating with a respective port channel, the manifold defining a port opening, a distant opening and a flow passage extending between the port opening and the distant opening, the manifold being fixedly attached to one or both of the end plates such that the port opening of the manifold covers one of the connection ports enabling communication between one of the plate interspaces and the distant opening, the manifold being made by additive manufacturing, moulding or casting, wherein the manifold comprises an integrated housing having an opening and a removable lid covering the opening, the lid comprising a mounting bracket for fastening the heat exchanger onto another object.

The housing can be e.g. a valve seat and/or an integrated thermostat housing and/or an integrated sensor housing as described above. The lid thereby fulfils the dual purpose of being a closure for the housing and being a mounting bracket for mounting the plate heat exchanger onto another object, i.e. the piece of equipment for which the plate heat exchange is intended. This will save space on the end plate which can be used for the manifold. The mounting bracket can also serve as a lifting aid when transporting the plate heat exchanger. The lid may preferably be manufactured by additive manufacturing.

The plate heat exchanger according to the third aspect may include any feature of the heat exchanger according to the first aspect, such as heat exchanger plates made of thin stamped plates.

According to a further embodiment, the mounting bracket extending outwardly from the lid and beyond the circumferential rims of each heat exchanger plate.

In this way the plate heat exchanger can be easily fixated to a structure surrounding the heat exchanger. Preferably, the lid and the bracket extend along perpendicular planes and may e.g. form an "L" shape.

According to a further embodiment, the manifold comprising one or more further mounting brackets extending outwardly from the manifold and beyond the circumferential rims of each heat exchanger plate.

The plate heat exchanger is preferably mounted by a combination of the mounting bracket extending outwardly from the lid and the one or more mounting brackets extending outwardly from the manifold.

According to a further embodiment, the mounting bracket extending outwardly from the lid and the one or more mounting brackets extending outwardly from the manifold substantially within the same plane.

By having some or all the mounting brackets at the same level, finding a suitable surface for mounting and using the brackets for lifting will be easier. Alternatively, the position of the brackets may be flexible and adapted to the application.

DETAILED DESCRIPTION OF THE DRAWINGS

Figure 1A:
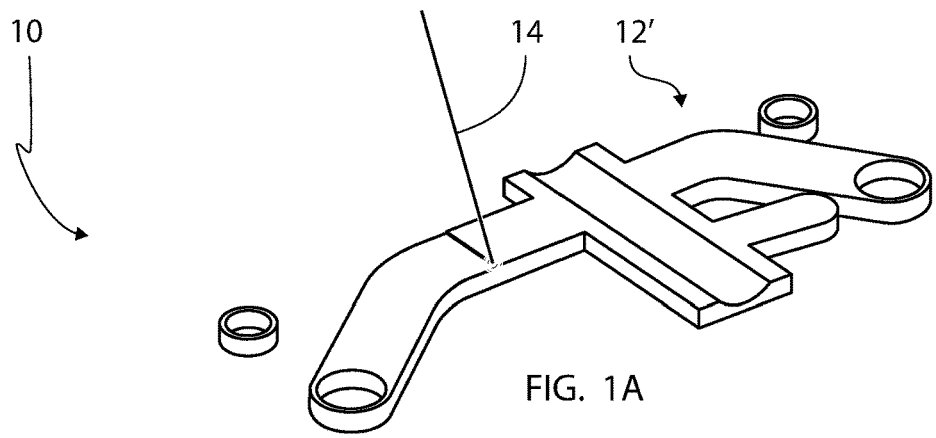
FIG. 1A shows 3D printing of a manifold onto a substrate plate

FIG. 1A shows the interior of a metal 3D printer 10 performing a method of 3D printing a separate manifold 12' (shown under construction) for a plate heat exchanger (not shown) onto a substrate plate (not shown). Substrate plate should in the present context be understood as the base located inside the 3D printer onto which the manifold 12' is being printed. The input to the 3D printer 10 can be a 3D CAD drawing of the manifold 12' and the 3D printer may be capable of producing the manifold 12' as an exact copy of the CAD drawing. This implies that the manifold 12' can be custom made in very small numbers. Several different 3D printing processes exist and are considered known in the art. One of the most common processes for metal 3D printing use a powder bed. This method spread a thin layer of metal powder onto a substrate plate and uses a laser 14 or similar energy beam to melt and fuse the metal powder at the locations that form the manifold 12'. The process is performed layer by layer, i.e. when the powder particles forming one layer of the manifold 12' has been fused together, another layer of metal powder is spread out and the process is repeated until the manifold 12' is completed. Some known processes include "Direct metal laser sintering (DMLS)" and "Selective laser sintering (SLS)".

Figure 1B:
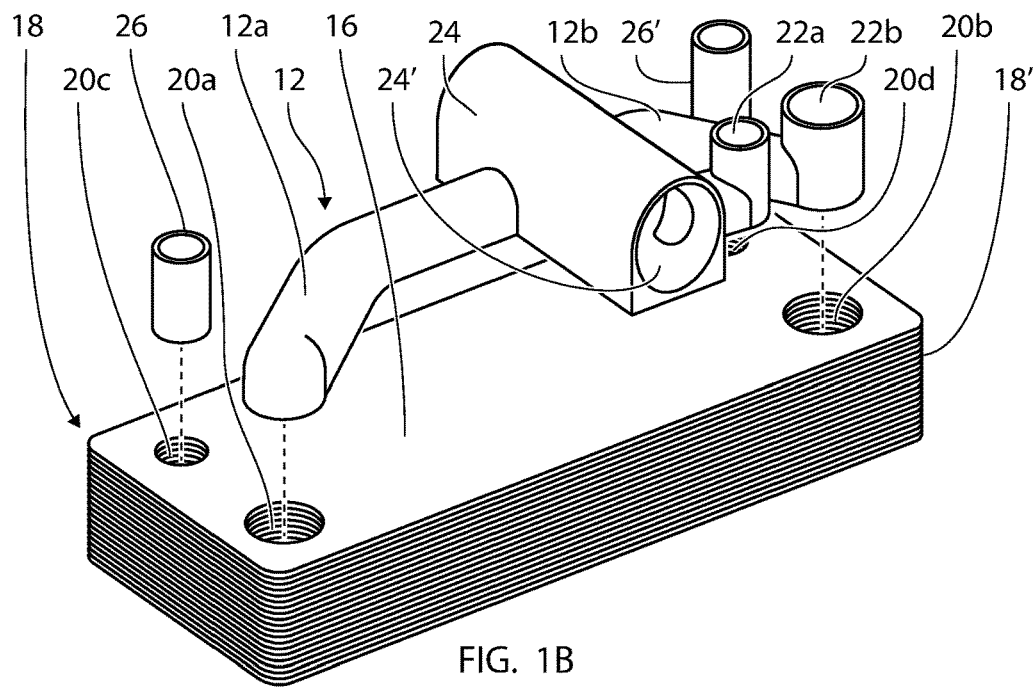
FIG. 1B shows the assembly of the manifold onto a plate package

FIG. 1B shows the assembly of the manifold 12 onto the end plate 16 of a plate package 18. The plate package 18 comprise a plurality of heat exchanger plates 18' stacked between opposite end plates 16 (only one end plate is visible). The end plate 16 of the plate heat exchanger 18 comprises four connection ports 20a/b/c/d. The heat exchanger plates 18' are sealed at their circumferential rims forming enclosed plate interspaces. The connection ports 20a/b/c/d define port channels extending through all of the heat exchanger plates 18' and ending at an opposite end plate (not shown) and communicate with the plate interspaces between the heat exchanger plates 18' such that every other plate interspace only communicate with the connection ports 20a and 20b and the remaining plate interspace communicate only with the connection ports 20c and 20d. The first and second plate interspaces are thus sealed off relative to each other and fluid communication to the plate interspaces are only provided via the portholes.

The manifold 12 comprises a first hollow part 12a forming a passage which is intended to extend to and cover the connection port 20a and a second hollow part 12b which is intended to extend to and cover the connection port 20b. The manifold 12 further comprises a third part which is interconnected to the first part 12a of the manifold 12 and which is comprising a first distant opening 22a. The second part 12b of the manifold 12 includes a second distant opening 22b. The distant opening 22a is thus intended to communicate with the connection port 20a of the plate package 18 via the first part 12a and the distant opening 22b is intended to communicate with the connection port 20b of the plate heat exchanger 18.

The present embodiment includes a housing 24 which is centrally located in the manifold 12 and communicating with the first part 12a and the second part 12b. The housing 24 may include a cavity 24' for accommodating a device such as a valve, thermostat, sensor or the like. Additionally, pipes 26 and 26' are provided for connecting to the respective connection ports 20c and 20d. The pipes 26 and 26' may be conventional connecting pipes or alternatively 3D printed. They may also form part of the manifold 12. Alternatively, the manifold 12 may be moulded or cast. In such case the mould or die may be made by 3D printing.

Figure 1C:
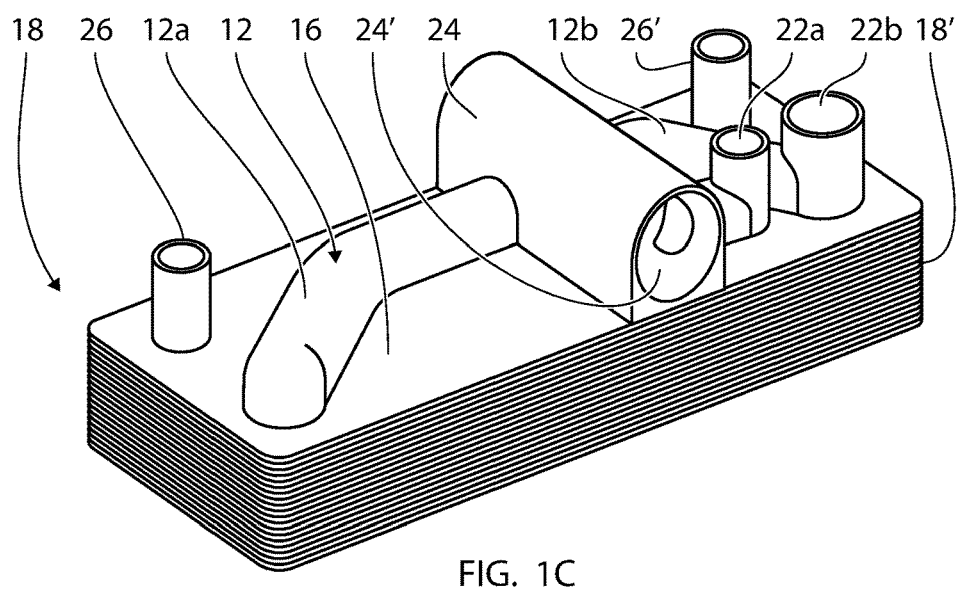
FIG. 1C shows the finished plate heat exchanger having a manifold

FIG. 1C shows the finished plate heat exchanger comprising the plate package 18 and the manifold 12. The manifold 12 may be bonded or brazed onto an already brazed plate package 18. Alternatively, the end plates 16, the heat exchanger plates 18' and the manifold 12 are brazed in the same brazing process. On top of the plate package 18 the 3D printed manifold 12 is attached positioned before the brazing or bonding cycle. The brazing of the complete heat exchanger is normally done in a heated oven, in which the heat exchanger is heated to above the melting point of the brazing material. In this way the end plates 16 and heat exchanger plates 18' are brazed together at the same time as the manifold 12 is brazed to the end plate 16. Typically, copper brazing is used.

In the present embodiment only one distant opening 22a is displaced relative to the position of the connection port 20a, however, it is feasible to have more than one distant opening displaced relative to the connection port, such as two, three or all four. The pipes 26 and 26' may thus be omitted and replaced by the manifold 12 with appropriate modifications.

Figure 2A:
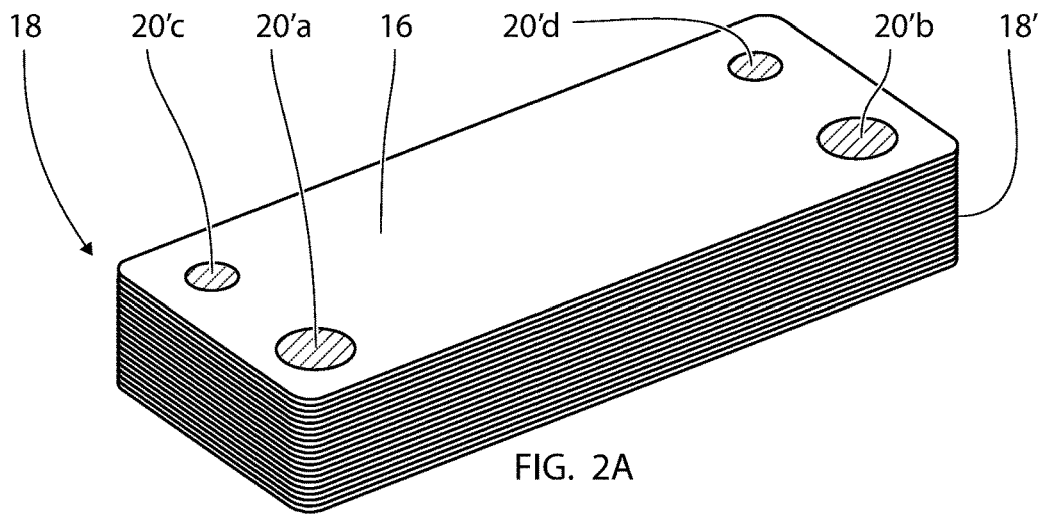
FIG. 2A shows a plate heat exchanger having covered connection ports

FIG. 2A shows a brazed plate package 18' having covered connection ports. The connection ports 20a/b/c/d are covered by removable plugs 20'a, 20'b, 20'c and 20'd at the end plate 16 for preventing any material falling into the port channels. The plate package 18' is otherwise similar to the plate package of the previous embodiment. The heat exchanging plates 18' and the end plates 16 are brazed together.

Figure 2B:
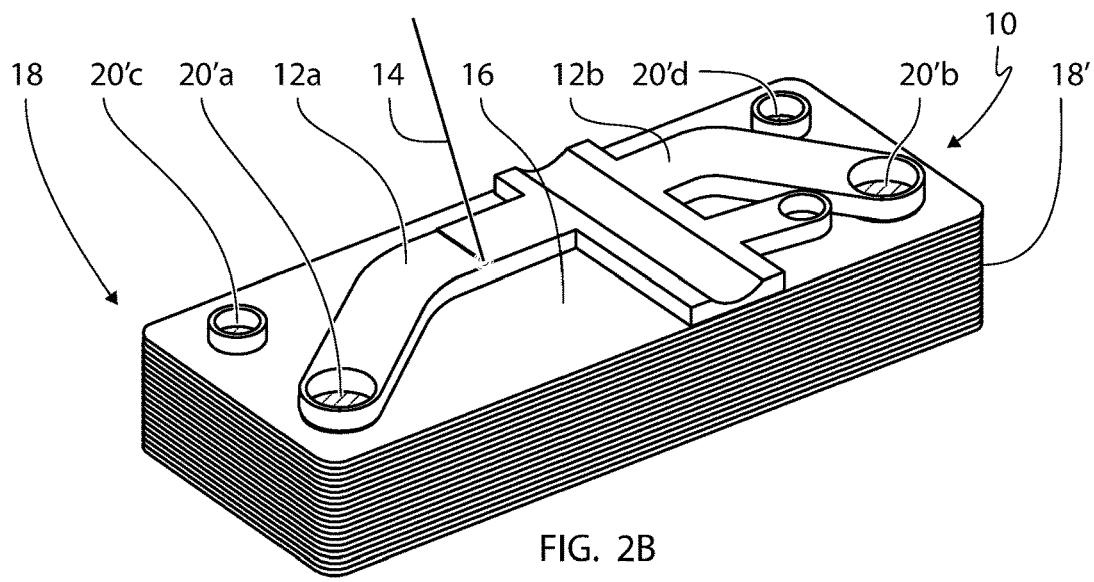
FIG. 2B shows 3D printing of a manifold onto a plate package

FIG. 2B shows the interior of a metal 3D printer 10 performing a method of 3D printing a manifold 12' onto the end plate 16 of the brazed plate package 18. In the present embodiment the complete brazed plate package 18 is put into a 3D printer 10 which is printing directly onto the end plate 16. The printing of the manifold 12' onto the end plate 16 is performed similar to the printing of the manifold onto the substrate plate in the previous embodiment, except that the printing of the manifold 12' onto the end plate 16 is made in a non-removable way, i.e. the first layer is bonded onto the end plate 16. The plugs covering the connection ports prevent metal powder from falling into the plate package during printing and form a flat surface for spreading the metal powder.

Figure 2C:
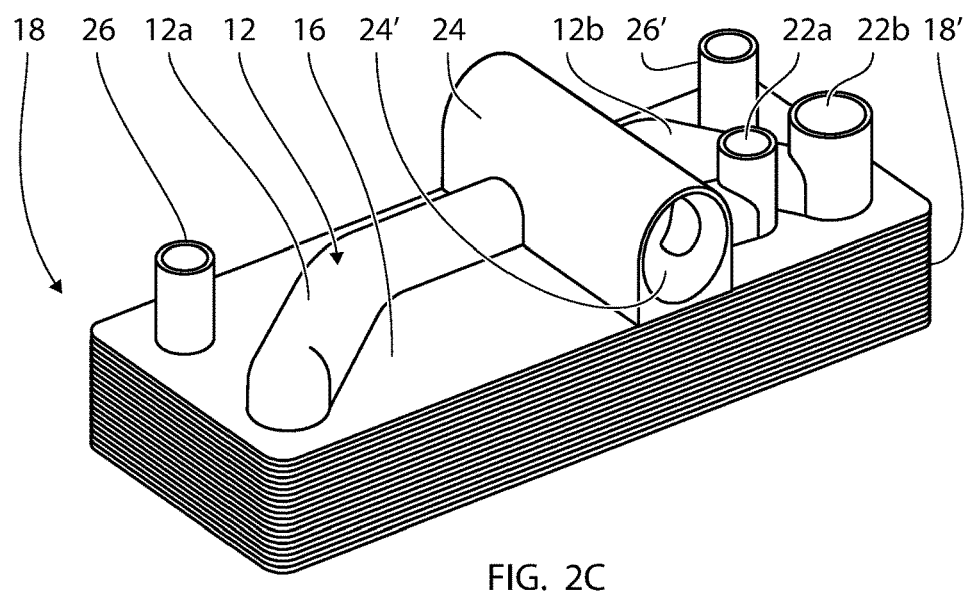
FIG. 2C shows the finished plate heat exchanger having a manifold

FIG. 2C shows the finished plate heat exchanger having a manifold 12. The present view is identical to the view of FIG. 1C and has the same features, however, the manufacturing method is different as the manifold is printed directly onto the end plate 18. As a final step, the plug covering the ports are removed. The plugs may be removed by being melted, dissolved or, if accessible, by being mechanically removed.

Figure 3A:
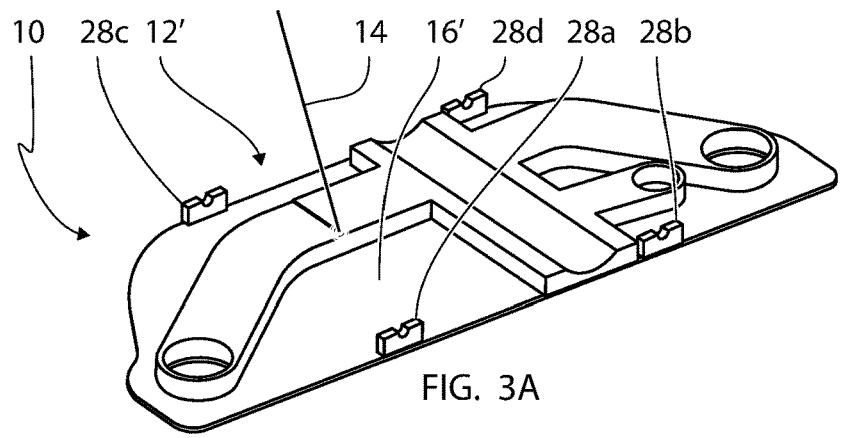
FIG. 3A shows 3D printing of a manifold onto a separate end plate

FIG. 3A shows the interior of a metal 3D printer 10 performing a method of 3D printing a manifold 12' onto a partial end plate 16' Further, lifting loops/mounting brackets 28a/b/c/d (under construction) are provided. The lifting loops/mounting brackets 28a/b/c/d and the partial end plate may be provided in any of the other embodiments as well. The setup is otherwise similar to the previous embodiment in that the printing of the manifold 12' onto the end plate 16' is made in a non-removable way.

Figure 3B:
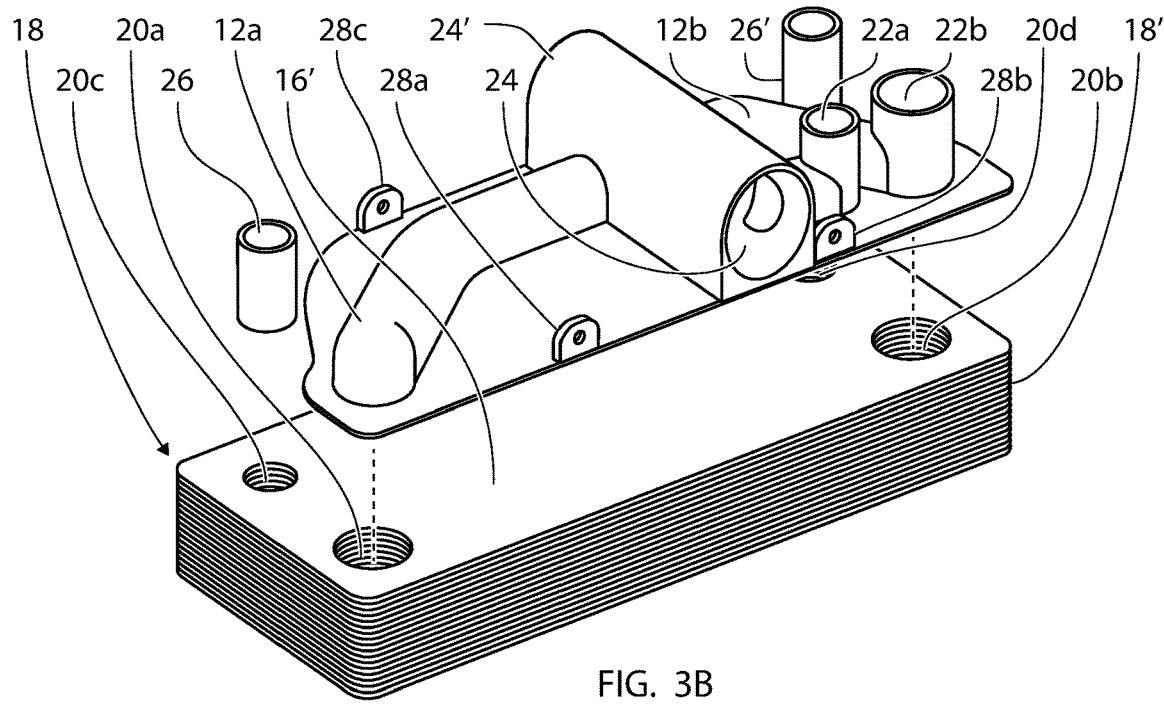
FIG. 3B shows the assembly of the end plate onto a plate package

FIG. 3B shows the assembly of the partial end plate 16' including the manifold 12 onto a plate heat exchanger 18. In the present case, the end plate 16 is only partially covering the top heat exchanging plate 18' of the plate package 18. In this way the connection ports 20a and 20b are covered by the partial end plate 16' whereas the connection ports 20c and 20d may be connected by other means. Alternatively, the end plate can be made to cover the complete top heat exchanging plate 18' of the plate package 18. The lifting loops/mounting brackets 28a/b/c/d can be used to move the assembly.

Figure 3C:
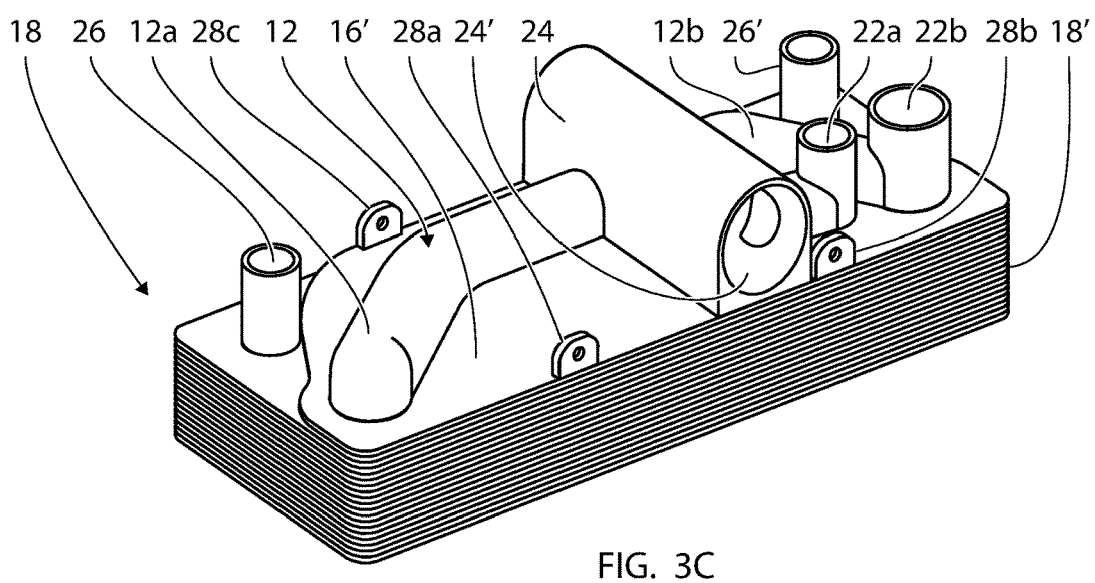
FIG. 3C shows the finished plate heat exchanger having a manifold

FIG. 3C shows the finished plate heat exchanger having a manifold. The present view is similar to the view of FIG. 1C and FIG. 2C and has similar features, however, the manufacturing method is different as the manifold is printed directly onto an end plate which is then fastened to a plate package. The plate package 18 may already brazed, or the heat exchanger plates of the plate package 18 are brazed together in the same operation as the end plate is brazed to the heat exchanger plates. There is also an opposite end plate provided which may lack any ports. The lifting loops/mounting brackets 28a/b/c/d can be used to move the heat exchanger or to fasten the heat exchanger onto another object.

Figure 4A:
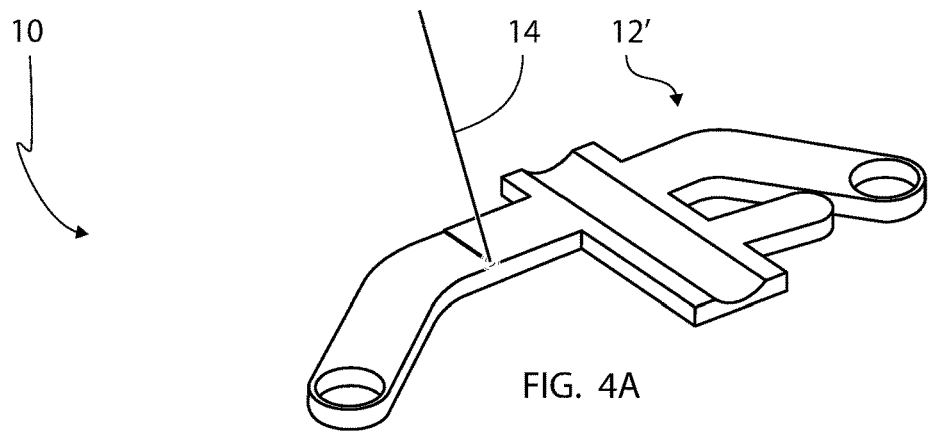
FIG. 4A shows 3D printing of a manifold onto a substrate plate

FIG. 4A shows the interior of a metal 3D printer 10 performing a method of 3D printing a separate manifold 12' (shown under construction) for a plate heat exchanger (not shown) onto a substrate plate (not shown). This is identical to FIG. 1A.

Figure 4B:
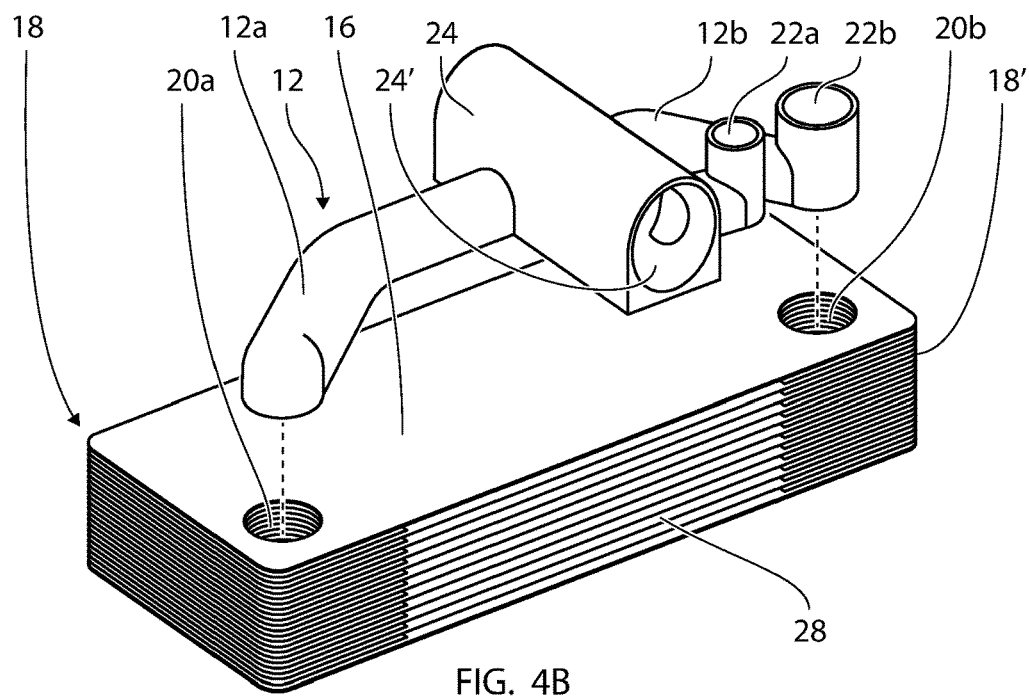
FIG. 4B shows the assembly of the end plate onto an alternative plate package

FIG. 4B shows the assembly of the manifold 12 onto the end plate 16 of an alternate plate package 18'. The alternate plate package 18' is identical to the plate package 18 of the previous embodiments except that the connection ports 20c and 20d connecting the second plate interspace has been omitted and instead side openings 30 are provided at the rim on opposite sides (only one side is visible here) for accessing the second plate interspaces. The second medium is thus flowing directly through the second plate interspaces without any connection port or port channels.

The manifold 12 is identical to the previous embodiment and comprises a first hollow part 12a forming a passage which is intended to extend to and cover the connection port 20a and a second hollow part 12b which is intended to extend to and cover the connection port 20b. The present view shows the assembly of the manifold 12 onto the plate package 18 similar to FIG. 1B, however, the manifold 12 may also be 3D printed onto a plate package as in FIG. 2B or onto an end plate as in FIG. 3A/B.

Figure 4C:
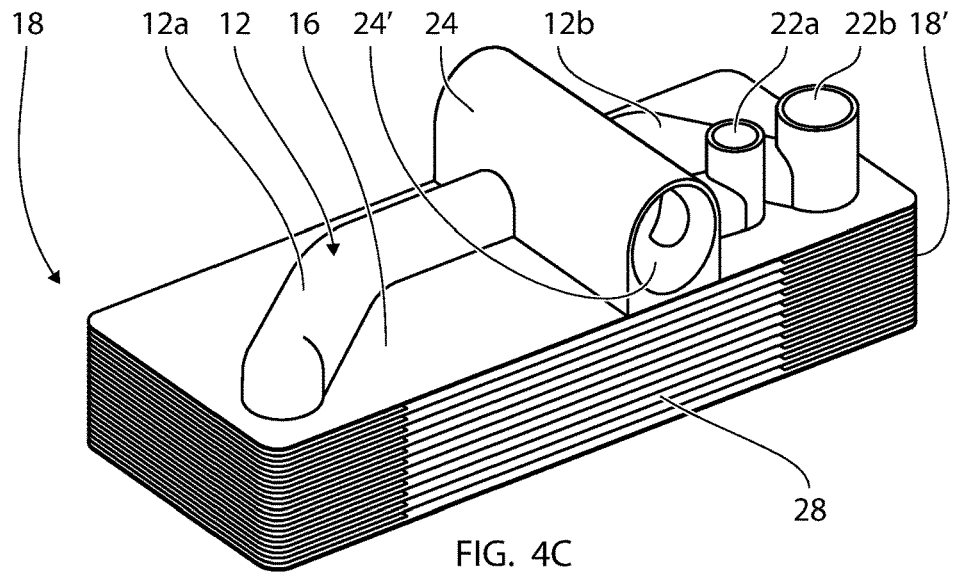
FIG. 4C shows the finished alternative plate heat exchanger having a manifold

FIG. 4C shows the finished plate heat exchanger comprising the plate package 18' and the manifold 12 similar to the previous embodiments.

Figure 5A:
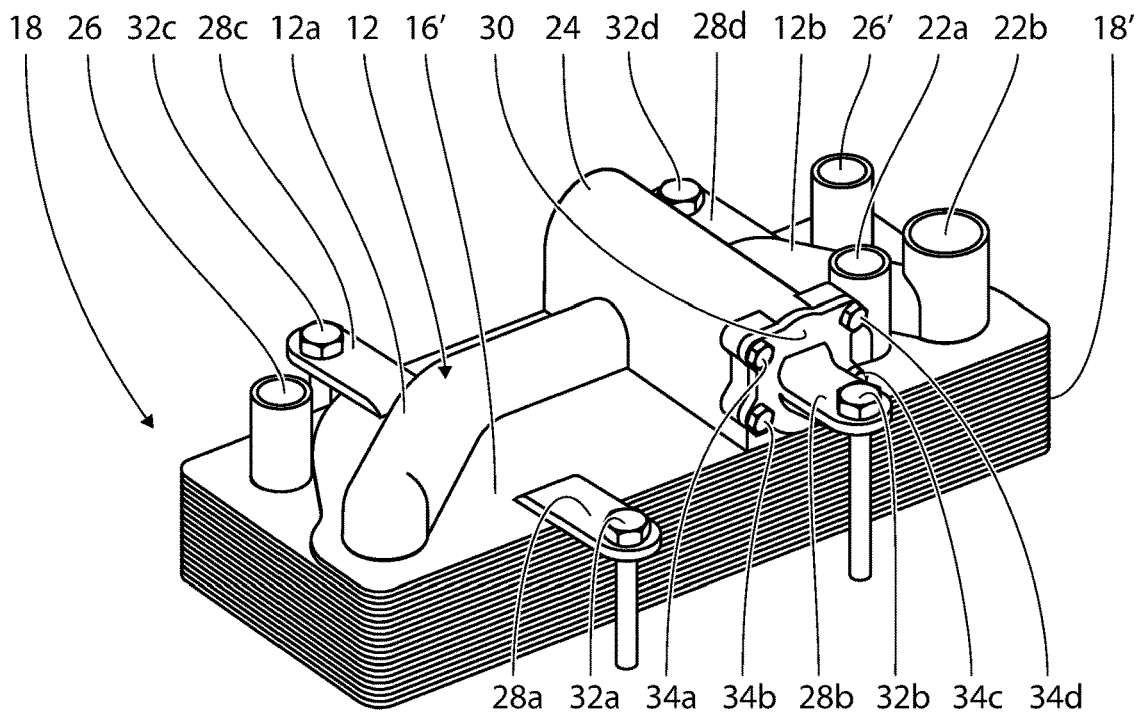
FIG. 5A shows a plate heat exchanger having a manifold and a lid with a bracket

FIG. 5A shows a plate heat exchanger similar to the previous embodiments having a manifold 12 and a lid 30 with an integrated bracket 28b. The lid 30 covers an opening into the cavity of the housing 24. The housing may be used for accommodating a device such as a valve, thermostat, sensor or the like. In the present embodiment brackets/lifting loops 28a/28c/28d are provided as an integral part of the manifold 12 or end plate 16. These brackets/lifting loops 28a/28c/28d are similar to the ones shown in connection with the embodiment of FIGS. 3a-c designated the reference numerals 28a/28b/28c/28d. In the present embodiment, the brackets/lifting loops 28a/28c/28d extend in the plane of the end plate 16'. However, one bracket/lifting loop 28b is provided as an integral part of the lid 30.

The brackets 28a/28b/28c/28d may be fastened to another object, such as the apparatus which the heat exchanger is intended for, by using respective screws/bolts 32a/32b/32c/32d. The lid 30 is in turn fastened to the housing 24 of the manifold 12 by using screws/bolts 34. The lid thus has a dual purpose, namely, to cover the cavity of the housing 24 and to fasten the heat exchanger to another object via the bracket/lifting loop 28b. This will save space on the end plate 16' which can be used for the manifold 12.

The lid 30 may be manufactured by additive manufacturing or any other method such as moulding or casting. It is typically made of metal; however, other materials are feasible.

Figure 5B:
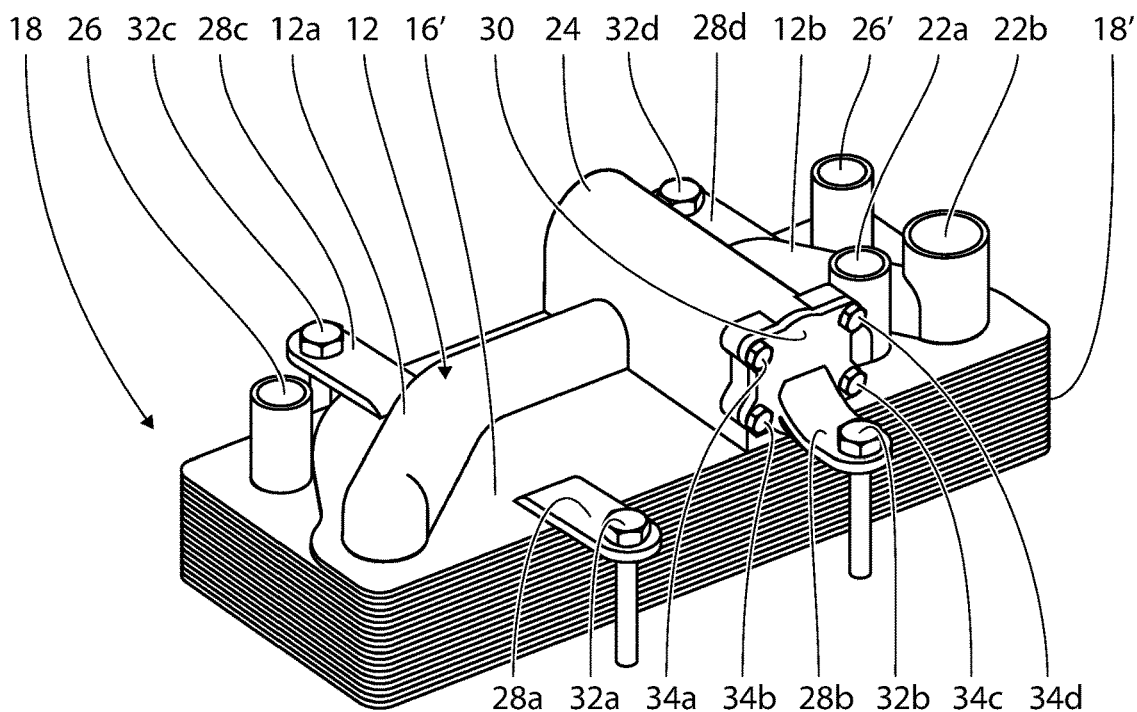
FIG. 5B shows a plate heat exchanger having a manifold and a lid with an alternative bracket

FIG. 5B shows a plate heat exchanger having a manifold 12 and a lid 30 with an alternative integrated bracket 28b. The present embodiment is identical to the embodiment of FIG. 5a except that the bracket/lifting loop 28b is extending from the edge of the lid in order to be level with the other brackets/lifting loops 28a/28c/28d, so that they may extend in the same plane.

The invention claimed is:

1. A plate heat exchanger comprising a plate package and a manifold both made of metal, the plate package comprising a plurality of heat exchanger plates made of thin stamped plates stacked between end plates, the heat exchanger plates being sealed to each other and to the end plates and form alternating first plate interspaces for a first medium and second plate interspaces for a second medium, the heat exchanger plates are sealed to each other at circumferential rims of each heat exchanger plate, the plate package defines at least two port channels communicating with the first plate interspaces and being sealed from communication with the second plate interspaces, at least one of the end plates define connection ports communicating with a respective port channel, the manifold defining a port opening, a distant opening and a flow passage extending between the port opening and the distant opening, the manifold being fixedly attached to one or both of the end plates such that the port opening of the manifold covers one of the connection ports enabling communication between one of the plate interspaces and the distant opening, the manifold being made by additive manufacturing.

2. The plate heat exchanger according to claim 1, wherein the plate package defines at least two further port channels communicating with the second plate interspaces and are sealed from communication with the first plate interspaces, preferably each heat exchanger plate in the plate package has a rectangular shape and an end plate with a connection port in each corner.

3. The plate heat exchanger according to claim 1, wherein more than one connection port of the plate pack are connected to a corresponding flow passage and distant opening in the manifold.

4. The plate heat exchanger according to claim 1, wherein the manifold comprises an integrated valve seat and/or an integrated thermostat housing and/or an integrated sensor housing.

5. The plate heat exchanger according to claim 1, wherein the end plates have a greater thickness than the heat exchanger plates.

6. The plate heat exchanger according to claim 1, wherein the end plate having the attached manifold only covers a part of the surface of the heat exchanging plate which the respective end plate faces.

7. The plate heat exchanger according to claim 1, wherein the manifold is permanently sealed to the first end plate and the heat exchanger plates are permanently sealed to each other and to the end plates by brazing, diffusion bonding or gluing.

8. The plate heat exchanger according to claim 1, wherein the manifold is mounted to the first end plate by screws or bolts and the heat exchanger plates are permanently sealed to each other and to the end plates by brazing, diffusion bonding or gluing.

9. The plate heat exchanger according to claim 1, wherein the porthole and the distant opening are oriented in different directions.

10. The plate heat exchanger according to claim 1, wherein the heat exchanger plates have a corrugated pattern, preferably made by stamping or pressing of metal sheets.

11. A method of manufacturing a manifold for a plate heat exchanger, the plate heat exchanger comprising a plate package made of metal and comprising a plurality of heat exchanger plates made of thin stamped plates stacked between end plates, the heat exchanger plates being sealed to each other and to the end plates and form alternating first plate interspaces for a first medium and second plate interspaces for a second medium, the heat exchanger plates are sealed to each other at circumferential rims of each heat exchanger plate, the plate package defines at least two port channels communicating with the first plate interspaces and being sealed from communication with the second plate interspaces, at least one of the end plates define connection ports communicating with a respective port channel, the method comprising providing a 3D printer and producing a manifold by additive manufacturing, the manifold defining a port opening, a distant opening and a flow passage extending between the port opening and the distant opening, the port opening of the manifold corresponding to one of the connection ports of one of the end plates of the heat exchanger for enabling communication between one of the plate interspaces and the distant opening.

12. The method according to claim 11, wherein the manifold is mounted to the first end plate by screws.

13. The method according to claim 11, wherein the manifold is formed by additively depositing material onto a substrate plate.

14. The method according to claim 12, wherein the manifold is formed by additively depositing material onto an end plate of a plate package.

15. The method according to claim 14, wherein the end plate forms part of the plate package and the connection ports being covered by removable covers during the additive manufacturing.

16. A plate heat exchanger comprising a plate package and a manifold both made of metal, the plate package comprising a plurality of heat exchanger plates stacked between end plates, the heat exchanger plates being sealed to each other and to the end plates and form alternating first plate interspaces for a first medium and second plate interspaces for a second medium, the heat exchanger plates are sealed to each other at circumferential rims of each heat exchanger plate, the plate package defines at least two port channels communicating with the first plate interspaces and being sealed from communication with the second plate interspaces, at least one of the end plates define connection ports communicating with a respective port channel, the manifold defining a port opening, a distant opening and a flow passage extending between the port opening and the distant opening, the manifold being fixedly attached to one or both of the end plates such that the port opening of the manifold covers one of the connection ports enabling communication between one of the plate interspaces and the distant opening, the manifold being made by additive manufacturing, moulding or casting, wherein the manifold comprises an integrated housing having an opening and a removable lid covering the opening, the lid comprising a mounting bracket for fastening the heat exchanger onto another object.

17. The plate heat exchanger according to claim 16, wherein the mounting bracket extending outwardly from the lid and beyond the circumferential rims of each heat exchanger plate.

18. The plate heat exchanger according to claim 17, wherein the manifold comprising one or more further mounting brackets extending outwardly from the manifold and beyond the circumferential rims of each heat exchanger plate.

19. The plate heat exchanger according to claim 18, wherein the mounting bracket extending outwardly from the lid and the one or more mounting brackets extending outwardly from the manifold substantially within the same plane.

20. The plate heat exchanger according to claim 16, wherein the plate packages defines at least two further channels communicating with the second plate interspaces and are sealed from communication with the first plate interspaces, preferably each heat exchanger plate in the plate package has a rectangular shape and an end plate with a connection port in each corner.

* * * * *